(12) United States Patent
Paugh et al.

(10) Patent No.: US 9,516,382 B2
(45) Date of Patent: Dec. 6, 2016

(54) APPARATUS AND METHOD FOR CONTENT DIRECTORY SERVER PRESENTATION

(71) Applicant: THOMSON LICENSING, Issy de Moulineaux (FR)

(72) Inventors: Adam Paugh, Zionsville, IN (US); Kerry Calvert, San Diego, CA (US); Kevin Barefoot, Cicero, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/370,066

(22) PCT Filed: Dec. 13, 2012

(86) PCT No.: PCT/US2012/069463
§ 371 (c)(1),
(2) Date: Jul. 1, 2014

(87) PCT Pub. No.: WO2013/103493
PCT Pub. Date: Jul. 11, 2013

(65) Prior Publication Data
US 2015/0020121 A1   Jan. 15, 2015

Related U.S. Application Data

(60) Provisional application No. 61/584,300, filed on Jan. 8, 2012, provisional application No. 61/584,302, filed on Jan. 8, 2012.

(51) Int. Cl.
*H04N 7/18* (2006.01)
*H04N 21/462* (2011.01)
(Continued)

(52) U.S. Cl.
CPC ...... *H04N 21/4622* (2013.01); *H04L 12/2812* (2013.01); *H04L 12/2834* (2013.01);
(Continued)

(58) Field of Classification Search
CPC .................................................. H04N 21/4332
USPC .......................................................... 725/78
See application file for complete search history.

(56) References Cited

U.S. PATENT DOCUMENTS 8,307,401 B1 * 11/2012 Lida ............................... 725/80
2006/0112018 A1 * 5/2006 Lee ................................ 705/59
(Continued)

FOREIGN PATENT DOCUMENTS

EP   2101484   9/2009
EP   2237528   10/2010

*Primary Examiner* — Nasser Goodarzi
*Assistant Examiner* — Michael B Pierorazio
(74) *Attorney, Agent, or Firm* — Brian J. Dorini; Michael A. Pugel

(57) ABSTRACT

A method and apparatus for content directory server presentation is described. The method includes connecting a device to media content sources, identifying a media content source as a temporary content source, the temporary content source not permanently connected to the home network, scanning, at a periodic rate, the media content source to identify media content, the rate being higher than a rate for a media content source that is not a temporary content source, and updating a catalog of media content available to the media device based on scanning the media content source. The apparatus includes a receiver scanning media content sources to identify available media content, and a controller determining if a media content source is not permanently connected to the home network, the controller increasing a periodic rate of scanning if the at least one media content source is not permanently connected to the home network.

36 Claims, 9 Drawing Sheets

(51) Int. Cl.
*H04L 12/28* (2006.01)
*H04N 21/433* (2011.01)
*H04N 21/436* (2011.01)
*H04N 21/458* (2011.01)
*H04N 21/482* (2011.01)
*H04N 21/643* (2011.01)

(52) U.S. Cl.
CPC .... *H04N21/4332* (2013.01); *H04N 21/43615* (2013.01); *H04N 21/458* (2013.01); *H04N 21/4586* (2013.01); *H04N 21/4825* (2013.01); *H04N 21/643* (2013.01)

(56) References Cited

U.S. PATENT DOCUMENTS

| | | | |
|---|---|---|---|
| 2007/0067816 A1* | 3/2007 | Van Horck et al. | 725/100 |
| 2007/0179948 A1* | 8/2007 | Jennings | H04L 67/1068 |
| 2008/0172388 A1 | 7/2008 | Lin et al. | |
| 2008/0208920 A1 | 8/2008 | Stirbu et al. | |
| 2009/0271816 A1 | 10/2009 | Guillorit | |
| 2009/0327892 A1 | 12/2009 | Douillet et al. | |
| 2011/0191445 A1* | 8/2011 | Dazzi | G06F 15/16 709/219 |

* cited by examiner

APPARATUS AND METHOD FOR CONTENT DIRECTORY SERVER PRESENTATION

REFERENCE TO RELATED PROVISIONAL APPLICATION

This application claims the benefit, under 35 U.S.C. §365 of International Application PCT/US2012/069463, filed Dec. 13, 2012, which was published in accordance with PCT Article 21(2) on Jul. 11, 2013 in English which claims the benefit of U.S. provisional patent application No. 61/584,300, filed Jan. 8, 2012 and claims the benefit of U.S. provisional patent application No. 61/584,302, filed Jan. 8, 2012.

TECHNICAL FIELD OF THE INVENTION

The present disclosure generally relates to systems that receive and manage media content and, more particularly, to an apparatus and method for receiving, managing, and presenting media content as part of a content directory in a receiving device.

BACKGROUND OF THE INVENTION

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Broadcast content service providers and Internet service providers continue to find synergies within their respective content delivery systems. Many new networked devices now include the ability to navigate and search through media content based on inherent capabilities from the provider of the media content or service. New networked devices, particularly those devices used in a home, are merging operations and functions associated with broadcast-centric and Internet network-centric devices. These new networked devices include televisions, settop boxes, home gateways, home computer media stations, tablets, and the like. These new networked devices further offer signal receiving, media recording, home networking, and Internet connectivity capabilities.

However, operational differences between the broadcast-centric devices and the Internet-centric devices remain a problem. As broadcast and Internet based media functions have been merged into a single device, new command, control, and content management issues have developed. For instance, presentation of media content from a number of different content sources may prove problematic, particularly when the content is located on mounted devices (e.g., universal serial bus (USB) memory, external drives, and the like) and are further located throughout the home network. A common way to browse/search the metadata on a file system device would be through a proprietary interface on the set top box (STB) using a basic file system browser that may be limited in its ability to search for metadata in real-time if the user requested. This process can be slow and also may only be able to search one device at a time. Further, problems and delays may occur if one or more of the devices in the network are only periodically connected to the network. A mechanism is needed that allows a user to access the media content using a home network device.

SUMMARY

According to an aspect of the present disclosure, a method for content directory server presentation is described. The method includes connecting a media device to a home network, the home network containing a plurality of media content sources, identifying at least one media content source from the plurality of media content sources as a temporary content source, the temporary content source not permanently connected to the home network, scanning, at a periodic rate, the at least one media content source to identify media content on the at least one media content source, the periodic rate being higher than a periodic rate for a media content source that is not identified as a temporary content source, and updating a catalog of media content available to the media device based on scanning the at least one media content source.

According to an aspect of the present disclosure, an apparatus for content directory server presentation is described. The apparatus is connected to a plurality of media content sources and includes a receiver coupled to the home network, the receiver scanning the plurality of media content sources to identify available media content, and a controller coupled to the receiver, the controller determining if at least one media content source from the plurality of media content sources is not permanently connected to the home network, the controller increasing a periodic rate of scanning for available media content from the at least one media content source if the at least one media content source is not permanently connected to the home network.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

Figure 1:
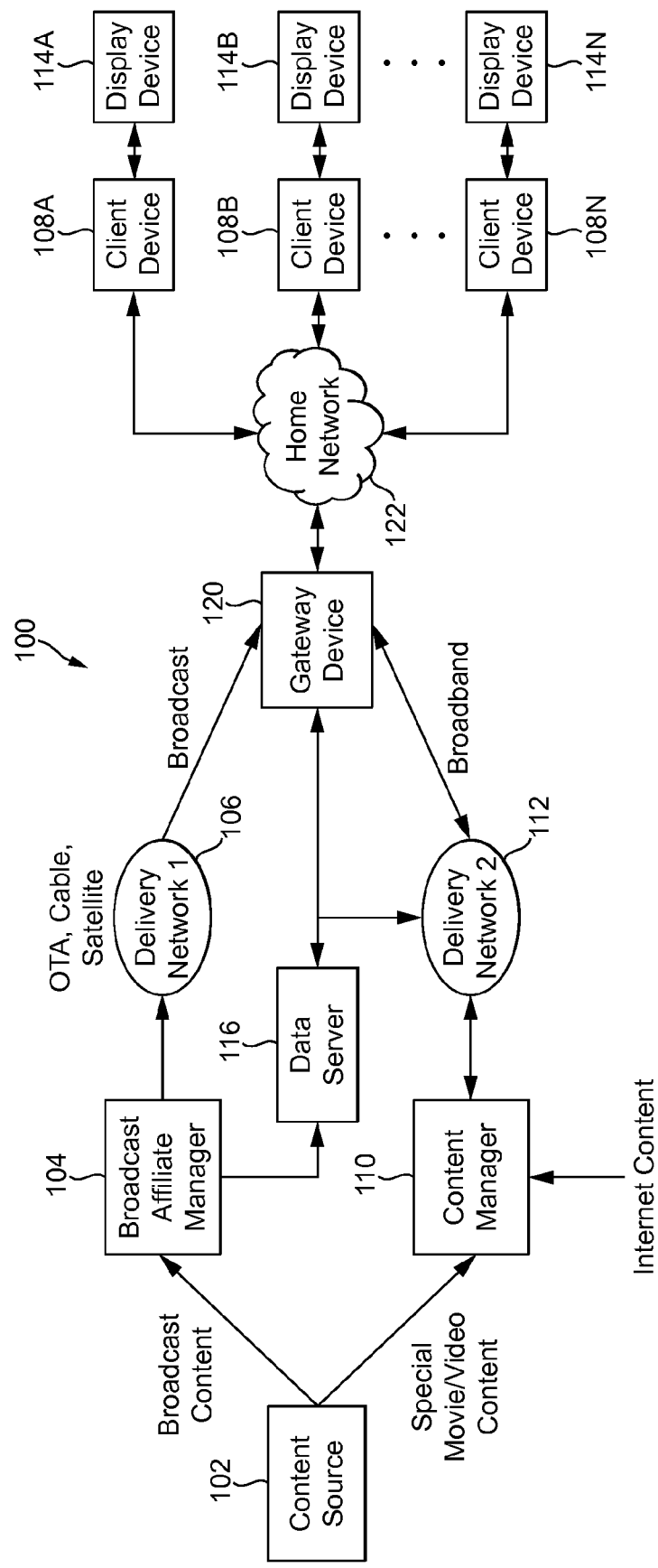
FIG. 1 is a block diagram of an exemplary system for delivering video content in accordance with the present disclosure.

It should be understood that the drawing(s) are for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present embodiments address problems associated with efficiently receiving, managing, and presenting media content a part of a content directory structure in a device connected to a network. The embodiments are directed at managing and updating the identification and presentation of media content that is available to the device from other devices in the network. The embodiments include a dynamic content cataloging system for devices connected in a home network, and specifically for devices that may be dynamically connected to the home network. Embodiments describe a process for recursively scanning devices on the network and building or adjusting a catalog of media content available to a media device connected to the network. The content discovery process is further adapted to identify migrant or removable content sources and to recursively or periodically scan these devices at a different timing interval than the other devices on the network.

The present disclosure further relates to the generation and display of the media content that is available for playback in a media device, the display incorporating content that is available through other devices on a local or home network. First, when a new device is connected to the network, or to the media device in question, information about the available media content is retrieved to the media device. This information includes metadata about the media content. Then a playlist view, as part of a user interface, is created using the information. This playlist view is set up as a set of parallel structures that form a tree structure. The structures include at least two different cataloging aspects for the content. For example, one structure may simply list all of the content. A second structure may catalog the content by which device the content is on. A third structure may catalog the content by media type. A user defined structure may also be possible. These structures may then be displayed, often simultaneously, in order to speed up the user's selection of the media content playback.

The content management structure supports home network components, including components with temporary access and differing content file structures. The embodiments allow a user to browse and/or search rich metadata (e.g., title, actor, genre, artist, etc. . . . ) associated with content on any externally networked or internally mounted device with a file system (e.g., USB storage device, Bluetooth network device, Ethernet device, Hard Drive) through any digital living network alliance (DLNA) device (e.g., digital media player (DMP), digital media controller (DMC) or the like) or through a separate middleware interface on another device. For example, the device containing the content may be mounted to a STB that runs a middleware software package including content management system (CMS) software. The user may also stream the content from the networked or mounted device onto another DLNA device using the CMS component as a DLNA digital media server (DMS). The user may customize how and where the content should appear in the content directory server (CDS) tree or view. A file system plug-in in CMS may further scan the networked or mounted device or file path recursively or periodically for media files and pull metadata out of each media file and cache it in a database. The file system's content can appear in a dynamic rule-based container or a CDS sub-tree that matches the folder tree/file structure of the device. The tree containers are configurable. The user may choose the parent location of the folder trees in the view configuration as well as specify whether to include trees from internal folders, external devices, or both. Additionally, a default view represents the root node of the view used for the CDS tree that is exposed and viewable to DLNA compliant devices.

Turning now to FIG. 1, a block diagram of an embodiment of a system 100 for delivering video content to the home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting Company (CBS), etc. The broadcast affiliate manager may collect and store the content, and may schedule delivery of the content over a delivery network, shown as delivery network 1 (106). Delivery network 1 (106) may include satellite link transmission from a national center to one or more regional or local centers. Delivery network 1 (106) may use any one of the standard transmission protocols and standards for content delivery (e.g., Advanced Television Systems Committee (ATSC) A/53, digital video broadcast (DVB)-Cable (DVB-C), DVB-Satellite (DVB-S), or DVB-Terrestrial (DVB-T)). Delivery network 1 (106) may also include local content delivery using local delivery systems such as over the air broadcast, satellite broadcast, or cable broadcast. The locally delivered content is provided to a gateway device 120 in a user's home. Broadcast affiliate manager 104 also provides information to data server 116. This information may include, but is not limited to, data associated with programming, delivery or broadcast schedules, or other types of information related to the broadcast content.

Additional information (e.g., special notices or scheduling information) or other content not provided to the broadcast affiliate manager may be delivered from content source 102 to a content manager 110. The content manager 110 may be a service provider affiliated with a content provider, broadcast service, or delivery network service. The content manager 110 may operate through an Internet website or web service. The content manager 110 may also incorporate Internet content into the delivery system. The content manager 110 may deliver the content to the user's gateway device 120 over a separate delivery network, delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106). In addition, the user may also obtain content directly from the Internet via delivery network 2 (112) without necessarily having the content managed by the content manager 110.

Data server 116 receives the information from broadcast affiliate manager 104 and translates the information into a content stream suitable for delivery to a user device (e.g., client device 108). Data server 116 may include a web service for a web site or some networking site. Data server 116 may connect to delivery network 2 (112) to provide the content stream and information to the gateway device 120. Alternatively, data server 116 may include a network interface to a cellular network or other wireless delivery network and provide the content and information in a format compatibility with the wireless network directly to gateway device 120. Additionally, data server 116 may receive information from the Internet through for instance, content manager 110 and delivery network 2 (112). The additional interface permits other content, such as but not limited to information related to programs, supplemental content, and scheduling to be provided to and from data server 116 from sources other than broadcast affiliate manager 104 (e.g., other users, websites, or news agencies).

Gateway device 120 may receive different types of content from one or more of the delivery networks described earlier as well provide messages or information from devices in the user's home back to one or more of the delivery networks. Gateway device 120 processes the content and provides a separation of the content based on instructions provided with the content or over the delivery network. Gateway device 120 may also process and separate content based on instructions received via user commands communicated from client devices 108A-108N through home network 122. Gateway 120 may also provide storage, such as a hard drive or optical disk drive, for recording and/or storing the content as well as providing the content for playback through home network 122. Gateway device 120 may be a settop box, home media server, computer media station, home network gateway, multimedia player, modem, router, home network appliance, or the like.

Gateway device 120 provides the interface between the networks, operating as a wide area network (WAN), and the home network 122, operating as a local area network (LAN). Home network 122 may include both wired and wireless LAN communications. Wired communications may include physical interfaces and wiring for Ethernet, Multimedia over Coaxial cable Alliance (MoCA), or other similar signal formats. Wireless communications may include physical interfaces to accommodate one or more wireless formats including Wi-Fi, Institute of Electrical and Electronics Engineers standard IEEE 802.11 or other similar wireless communications protocols.

Home network 122 connects the gateway device 120 to client devices 108A-108N at the user's premises. Each of the client devices 108A-108N may include one or both interfaces for wired or wireless communication connection to the home network 122. Client devices 108A-108N may be a cable STB, Internet protocol (IP) STB, or satellite STB. The client devices 108A-108N may also be, but are not limited to, a computer device, tablet, display device, television, wireless phone, personal digital assistant (PDA), computers, gaming platform, remote control, multi-media player, or home networking appliance that includes both broadcast and Internet interfaces, and may further include a storage media for digital video recording. The client devices 108A-108N further process the content from gateway 120 provided through home network 122 and also process and manage user preferences and commands. The client devices 108A-108N may also include a storage device, such as a hard drive or optical disk drive, for recording and playing back audio and video content. Further details of the operation of the client devices 108A-108N and features associated with processing and playing back stored content will be described below in relation to FIG. 3.

The processed content from client devices 108A-108A is provided to display devices 114A-114A. The display devices 114A-114N may be conventional two-dimensional (2-D) type displays or may alternatively be advanced three-dimensional (3-D) type displays. It should be appreciated that other devices having display capabilities including, but not limited to, computer devices, tablets, gateways, display devices, televisions, wireless phones, PDAs, computers, gaming platforms, remote controls, multi-media players, home networking appliances or the like, may employ the teachings of the present disclosure and are considered within the scope of the present disclosure.

It is important to note that any media programs and content as well as any information related to the media programs and content (e.g., program guides or program metadata) may originate at a content source (e.g., content source 102) or at a server device (e.g., server 116). The content and information may be transmitted to a content manager and eventually delivered over either delivery network 1 (106) or delivery network 2 (112) to a user's home (e.g., gateway device 120 and client devices 108A-108N). Alternatively, content and information from the content source may be delivered to a data server, such as data server 116, re-formatted, and then delivered to the user's home. Still further, content and information may originate at the data server (e.g., data server 116) or at a third party source on the Internet and provided to the data server 116 for delivery to the user's home.

In operation, system 100 provides the networking and communication capability for connecting and sharing media content from the WAN between devices on a home network principally through the use of gateway device 120 and client devices 108A-108N. In one embodiment, media content for a particular program from broadcast affiliate manager 104 is provided to client device 108B through gateway device 120. Gateway device 120 may also record the content based on a user request from client device 108A. At another point in time, the user of client device 108N desires to view the particular program and requests a search of the available content. Gateway device responds to the request indicating that the particular program is stored and is available for viewing.

Figure 2:
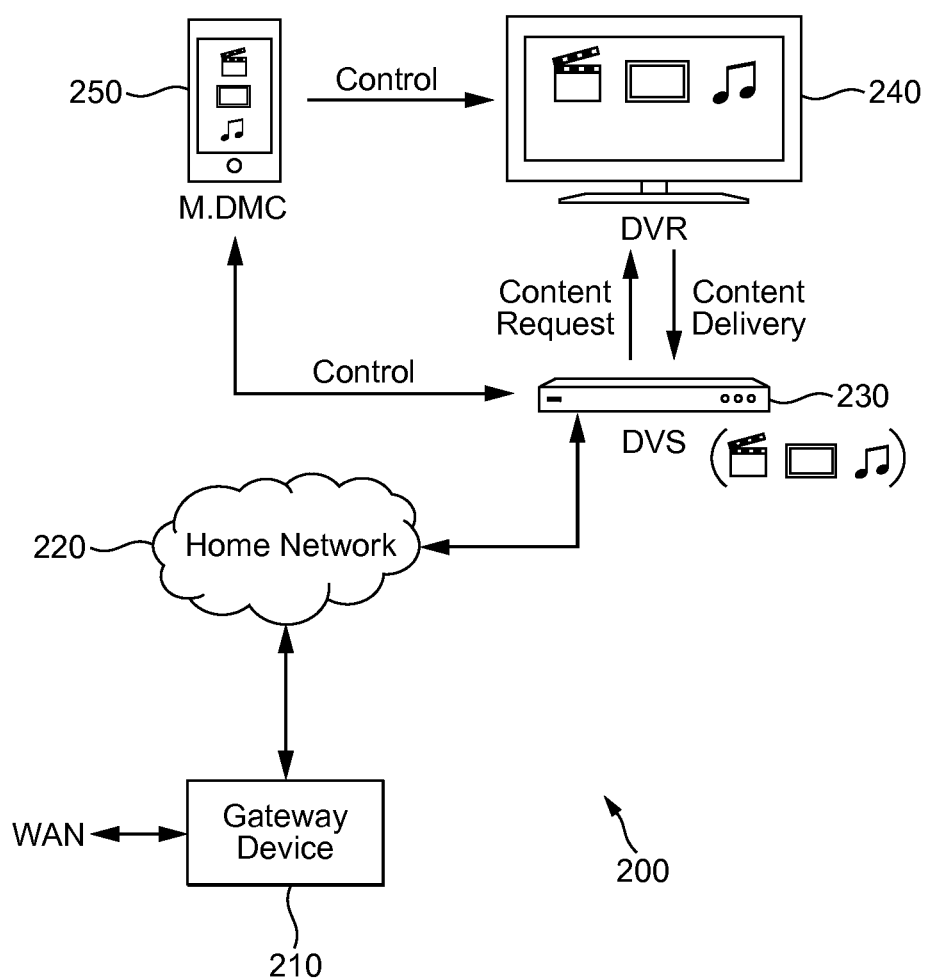
FIG. 2 is a block diagram of an exemplary home network system in accordance with the present disclosure.

Turning to FIG. 2, a block diagram of a home network system 200 according to aspects of the present disclosure is shown. Home network system 200 operates in a manner similar to the gateway device and the LAN portion of system 100 described in FIG. 1. In particular, home network system 200 operates according to functions associated with the DLNA protocol. In gateway system 200, Gateway 210 is interfaced between the WAN and home network 220. Home network 220 is connected to digital media server (DMS) 230. DMS 230 is connected to digital media renderer (DMR) 240. A mobile digital media controller (M-DMC) 250 is coupled to both DMS 230 and DMR 240. It is important to note that home network system 200 represents one possible embodiment of many possible home network systems based on the DLNA protocol or any other similar home network protocol.

Home network system 200 operates as part of a communication network and acts to interface data and media content between the WAN portion of the communication network and one or more devices on a home network. Gateway device 210 provides the interface between the WAN, and home network 220. In one embodiment, gateway 202 provides internet protocol (IP) services (e.g., data, voice, video, and/or audio) between a cable, DSL, or satellite WAN and DMS 230. Gateway 210 also provides IP services between DMS 230 and internet destinations identified and connected through the WAN. Gateway 210 also provides IP voice services between a phone device, such as a M-DMC, and call destinations routed through the WAN.

Home network 220 may include wireless communication capability. A wireless interface may be included in gateway device 210 and may accommodate one or more wireless formats including Wi-Fi, Institute of Electrical and Electronics Engineers standard IEEE 802.11 or other similar wireless communication formats. A similar wireless interface may be included in DMS 230 and may also be included in DMR 240 and M-DMC 250. Home network 220 may also include wired communication capability. A wired communication interface may be included in gateway device 210 and may accommodate one or more wired formats including Ethernet, MoCA, or other similar signal protocols. A similar wired interface may be included on DMS 230 as well as on DMR 240 and M-DMC 250.

Further, both the wired and wireless interfaces and communication formats in home network 220 may support a communication protocol between devices based on the DLNA protocol. DLNA defines interoperability guidelines to enable sharing of digital media content such as music, photos and videos between devices such as computers, TVs, printers, cameras, cell phones, and other multimedia devices. DLNA uses Universal Plug and Play (UPnP) for media management, discovery and control. UPnP defines the type of device that DLNA supports (e.g., "server", "renderer", "controller") and the mechanisms for accessing media over a network. The DLNA guidelines also apply a layer of restrictions over the types of media file formats, encodings and resolutions that a device must support.

DMS 230 interfaces to home network 220 and provides storage and playback capabilities for media content. DMS 230 acts as a DLNA "server" device. DMS 230 may include a user interface as well as the capability to be controlled by an external device, such as M-DMC 250. DMS 230 may also include video and audio conversion processors and functionality. DMS 230 may include a plurality of interface protocols for receiving and delivering media content to other networked devices (e.g., DMR 240 and M-DMC 250). These interface protocols include, but are not limited to DLNA, HDMI, SPDIF, and the like. DMS 230 may be a settop box, a personal computer, a network-attached storage (NAS) device, or the like.

DMR 240 interfaces to DMS 230 and provides video and audio display and reproduction capability. DMR 240 acts as a "renderer" device. DMR 240 may also include a user interface as well as the capability to be controlled by an external device, such as M-DMC 250. DMR 240 may be a television, audio/video receiver, video displays, remote speakers for music, or the like.

M-DMC 250 interfaces to both DMS 230 and DMR 240. M-DMC 250 acts as a "controller" device. Controller devices, such as M-DMC 250 discover and identify content on digital media servers (e.g., DMS 230) through a command and control interface as part of DLNA. M-DMC 250 may also direct the operation of one or more of the devices in the network. In some cases, M-DMC 250 may also provide content to the DMR 240, in addition to providing control for both DMS 230 and DMR 240. M-DMC 250 may be an Internet ready tablet device, Wi-Fi enabled digital camera, mobile cellular phone, advance remote control device, personal digital assistant, or the like.

It is important to note that one or all of the elements described in home network system 200 may be present in the same room or may be present in separate rooms at a user's premises. For example, gateway device 210 and DMS 230 may be located in a utility room, while DMR 240 and M-DMC 250 may be located in a family room. Also, more than one of the elements described in home network system 200 may be present in the user's premises and connected through home network 220 and/or operating using the DLNA protocol. For example, a second DMR may be located in a bed room and operated using M-DMC 250 with content provided through DMS 250.

Further, it is important to note that the functions described for gateway device 210 and DMS 230 may be merged into a single component or transferred and/or shared between components. For example, DMS 230 may include all functionality that is included in a gateway device, such as gateway device 210, and used as the interface to the WAN. Other devices, not shown, (e.g., computers, tablets, routers and the like), that are also connected to home network 220 would interface and communicate with DMS 230 in order to interface and communicate to the WAN.

Figure 3:
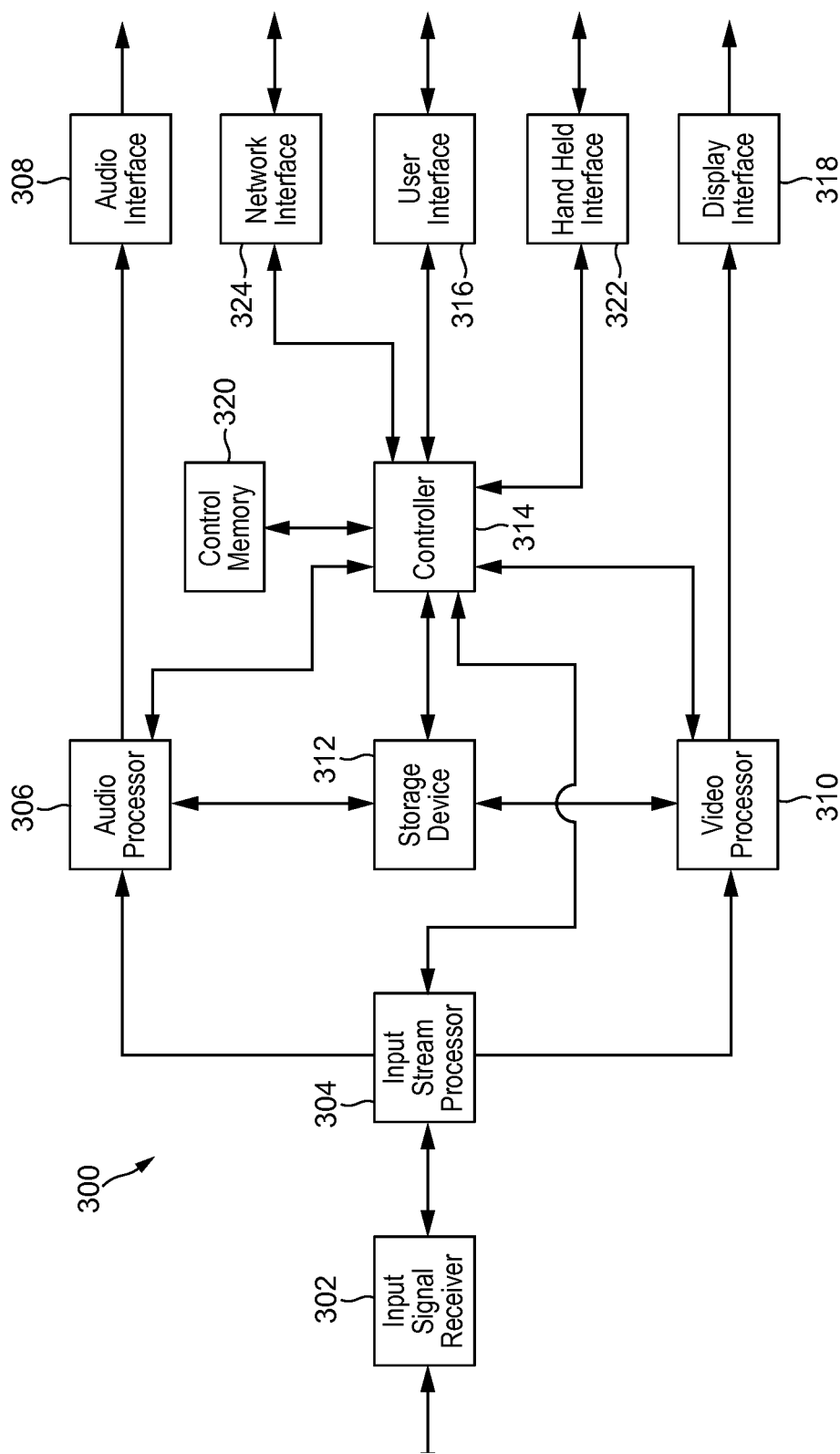
FIG. 3 is a block diagram of an exemplary network device in accordance with the present disclosure.

Turning now to FIG. 3, a block diagram of an embodiment of a network device 300 is shown. Except as described below, the network device 300 operates in a manner similar to client devices 108A-108N described in FIG. 1 or to gateway device 210 and/or DMS 230 described in FIG. 2. Network device 300 may also be incorporated into other systems including a display device, such as display devices 114A-114N, or DMR 240. In either case, several components necessary for complete operation of the system are not shown in the interest of conciseness, as the components not shown are well known to those skilled in the art.

Signals are interfaced to network device 300 at input signal receiver 302. Input signal receiver 302 connects to input stream processor 304. The input stream processor 304 connects to audio processor 306 and video processor 310. Audio processor 306 connects to audio interface 308, which provides the audio output signal from network device 300. Video processor 310 connects to display interface 318 which provides the video output signal from network device 300. Audio processor 306 and video processor 310 also connect to a storage device 312. A controller 314 connects to the storage device 312, as well as input stream processor 304, audio processor 306, and video processor 310. A control memory 320 connects to the controller 314. Controller 314 also connects to user interface 316 and handheld interface 322.

Content, as part of signal interfaced with the WAN, is received in an input signal receiver 302. The input signal receiver 302 may be one or more of several known receiver circuits used for receiving, demodulation, and decoding signals provided over one of the several possible networks including over the air, cable, satellite, Ethernet, fiber and phone line networks. It is important to note that input signal receiver 302 may include receiving, demodulation, and decoding circuitry for data signals as well as media content signals delivered over either the same delivery network as the desired broadcast input signal (i.e., delivery network 1 (106)) or over a different network, (i.e., delivery network 2 (112)) and/or an alternative cellular or wireless network as described in FIG. 1. The received media content and data over delivery network 2 (112) or wireless network may be different from the media content and delivery network 1 (106). The data may include information associated with scheduling changes and updates as well as information related to the media content delivered over either delivery network. In one embodiment, a cable broadcast signal is received, demodulated, and decoded in a cable tuner circuit in signal receiver 302. The desired broadcast input signal may be selected and retrieved in the input signal receiver 302 based on user input provided through a control interface (not shown). Input signal receiver 302 may also include an Internet protocol (IP) interface circuit that additionally provides bi-directional network connectivity.

The decoded output signal from one or more of the circuits in input signal receiver 302 is provided to an input stream processor 304. The input stream processor 304 performs the final signal selection and processing, and includes separation of video content from audio content for the content stream. The audio content is provided to an audio processor 306 for conversion from the received format (e.g., compressed digital signal) to another format (e.g., analog waveform signal). The analog waveform signal is provided to an audio interface 308 and further to a display device, such as display devices 114A-114N described in FIG. 1 and DMR 240 described in FIG. 2 or an audio amplifier (not shown). Alternatively, the audio interface 308 may provide a digital signal to an audio output device or display device using a High-Definition Multimedia Interface (HDMI) cable or alternate audio interface such as via a Sony/Philips Digital Interconnect Format (SPDIF). The audio processor 206 also performs any necessary conversion for the storage of the audio signals.

The video output from the input stream processor 304 is provided to a video processor 310. The video signal may be one of several formats. The video processor 310 provides, as necessary a conversion of the video content, based on the input signal format. The video processor 310 also performs any necessary conversion for the storage of the video signals.

A storage device 312 stores audio and video content received at the input. The storage device 312 allows later retrieval and playback of the content under the control of a controller 314 and also based on commands, e.g., navigation instructions such as fast-forward (FF) and rewind (Rew), received from a user interface 316. The storage device 312 may be a hard disk drive, one or more large capacity integrated electronic memories, such as static RAM (SRAM), or dynamic RAM (DRAM), an interchangeable optical disk storage system such as a compact disk drive or digital video disk drive, or storage external to, and accessible by, network device 300.

The converted video signal, from the video processor 310, either originating from the input or from the storage device 312, is provided to the display interface 318. The display interface 318 further provides the display signal to a display device of the type described above. The display interface 318 may be an analog signal interface, such as red-green-blue (RGB), or may be a digital interface (e.g., HDMI).

The controller 314 is interconnected via a bus to several of the components of the network device 300, including the input stream processor 302, audio processor 306, video processor 310, storage device 312, user interface 316, and handheld interface 322. The controller 314 manages the conversion process for converting the input stream signal into a signal for storage on the storage device or for display. The controller 314 also manages the retrieval and playback of stored content. The controller 314 is further coupled to control memory 320 (e.g., volatile or non-volatile memory, including RAM, SRAM, DRAM, read only memory (ROM), programmable ROM, electronically programmable ROM (EPROM), electronically erasable programmable ROM (EEPROM), flash memory, etc.) for storing information and instruction code for controller 314. Further, the implementation of the memory 320 may include several possible embodiments, such as a single memory device or, alternatively, more than one memory circuit connected together to form a shared or common memory. Still further, the memory may be included with other circuitry, such as portions of bus communications circuitry, in a larger circuit.

In addition to interfacing to a user interface element and a display device, network device 300 may also interface to a handheld device, such as a tablet, through handheld interface 322. This handheld device may include a display screen with additional controls or may include a touch screen. Video signals from video processor 310 as well as other data, such as the on screen display messages and message prompt returns, may be routed between controller 314 and handheld interface 322. Handheld interface 322 may transmit and receive signals and data with a handheld device or tablet using a radio frequency communications link, such as Wi-Fi, Bluetooth, or the Institute of Electrical and Electronics Engineers (IEEE) standard 802.11. Handheld interface 322 may alternatively transmit and receive signals and data with a handheld device or tablet using an infra-red interface.

In operation, device 300 implements a process for the generation and display of the media content that is available for playback in a media device, the display incorporating content that is available through other devices on a local or home network. Device 300 further implements a process for managing and updating the identification and presentation of media content that is available to the device from other devices in the network as part of a dynamic content cataloging system. The process may include determining when a new device is connected to the network, or to the media device in question, and identifying information about the available media content that is provided to the media device. This information includes metadata about the media content. Then a playlist view, as part of a user interface, is created using the information. This playlist view is set up as a set of parallel structures that form a tree structure. The process may also include recursively scanning devices on the network and building or adjusting a catalog of media content available to a media device connected to the network. The content discovery process is further adapted to identify migrant or removable content sources and to recursively or periodically scan these devices at a different timing interval than the other devices on the network.

Figure 4:
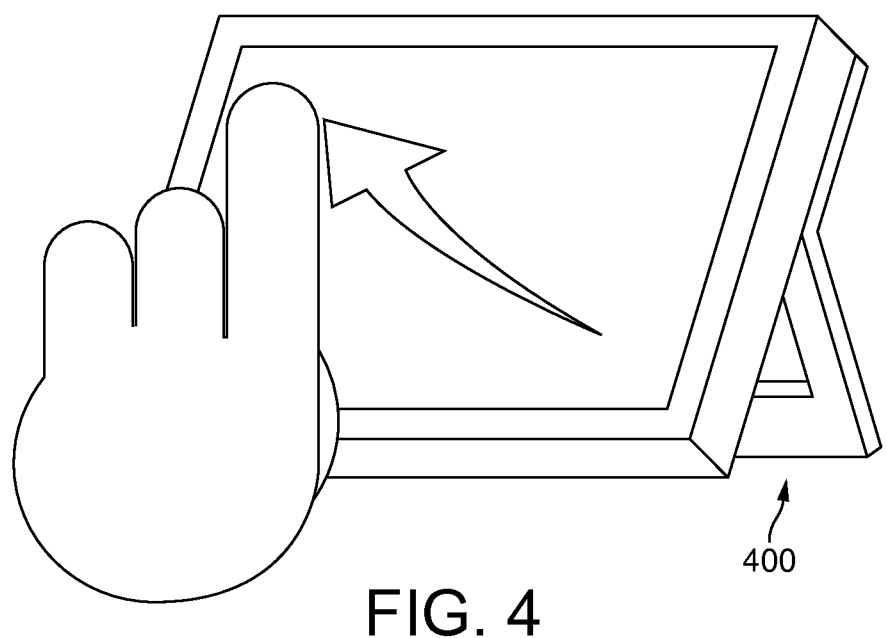
FIG. 4 is a perspective view of a touch panel device in accordance with the present disclosure.

The processes described in the present disclosure may employ an input device that can be used to express functions for searching a database, such as scrolling, browsing, paging, searching by word, etc. To allow for this, a touch panel device 400, shown in FIG. 4, may be interfaced via the user interface 316 and/or handheld interface 322 in network device 300, as shown in FIG. 3. The touch panel device 400 may operated in a manner similar to that described for M-DMC 250 in FIG. 2 and permit control of other components in the home network, including DMS 230 and DMR 240. Touch panel device further allows operation of a receiving device or set top box based on hand movements, or gestures, and actions translated through the panel into commands for the device (e.g., network device 300 or client device 108) or other control device. Further, touch panel device 400 may function as a second screen, allowing additional content, such as on screen display windows and messages to be displayed to the user without interrupting or obscuring the viewing of the main display device (e.g., display device 114). In one embodiment, the touch panel device 400 may serve as a navigational tool to navigate the display of an electronic program guide or content display guide. In other embodiments, the touch panel device 400 will additionally serve as the display device allowing the user to more directly interact with the navigation through the grid guide showing display of content. It is important to note that the touch panel device may be integrated into the settop box itself as part of, for instance, a front panel display or array. The touch panel device 400 may also be included as part of a remote control device containing more conventional control functions, such as activator or actuator buttons.

The functioning and control for the updating, managing, identifying and searching media content available from network or mounted devices as part of a directory as described herein may be encompassed as part of the operating code or firmware associated with a device (e.g., client devices 108A-N in FIG. 1, DMS 230 in FIG. 2 and network device 300 in FIG. 3). The process may include operating instructions written in any programming language (e.g., Java or hypertext markup language (HTML)). The application may be pre-loaded or downloaded (e.g., from a server or Internet site), and stored in a memory of the host device. It is to be appreciated that in one embodiment the instructions are stored in a memory (e.g., control memory 320 in FIG. 3) where the instructions are retrieved thereon and executed by a control circuit (e.g., controller 314). Further, the physical implementation of the algorithm or functions in the process may be done in hardware, such as discrete circuitry related to a video processor (e.g., video processor 310), or software, such as software residing in memory and read and executed by the control circuit. In another embodiment, the memory and a corresponding processor or controller to perform the processing may be integrated into a separate stand-alone integrated circuit (e.g., a digital processing processor (DSP) or an application specific integrated circuit (ASIC)).

Figure 5:
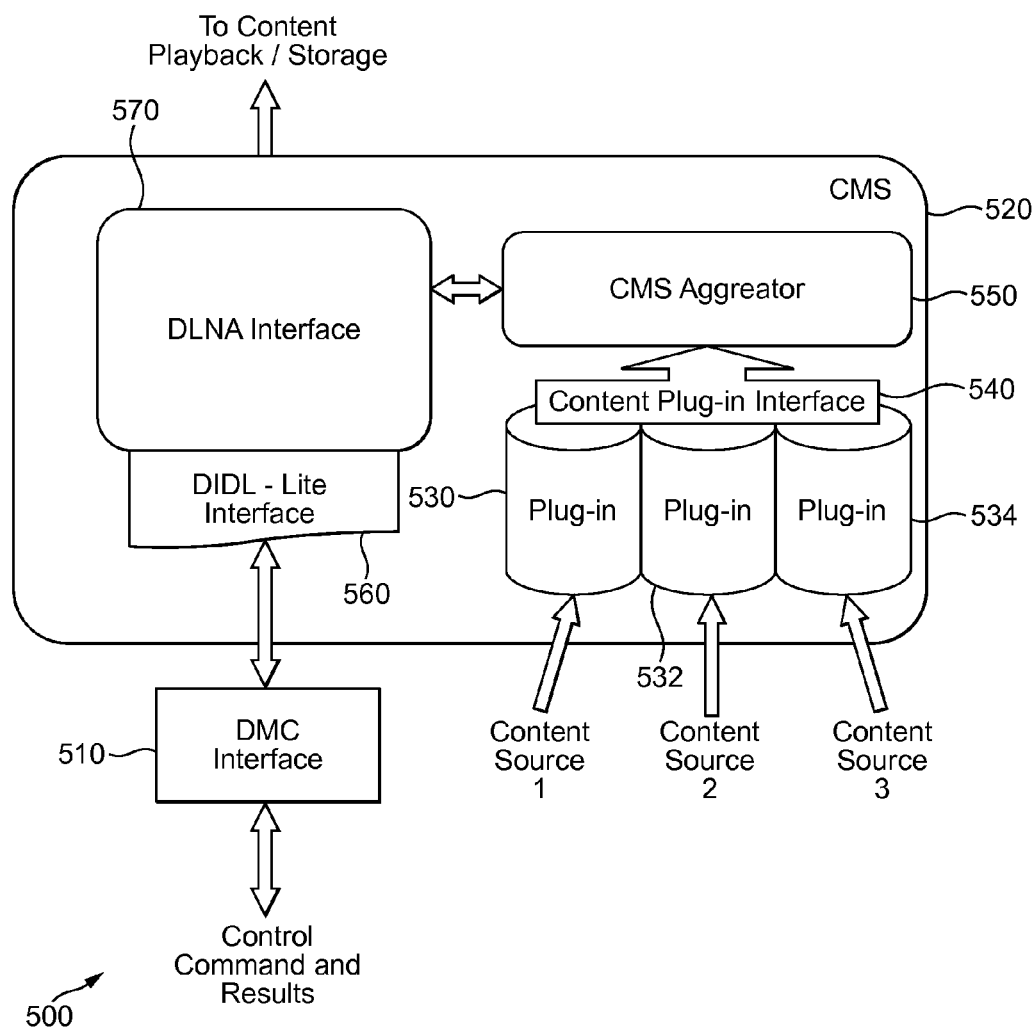
FIG. 5 is a diagram of an architecture for a portion of operating code for managing a media content database in accordance with the present disclosure.

Turning to FIG. 5, a diagram of an exemplary architecture 500 for a portion of operating code used to manage a media content database in a receiving device in accordance with aspects of the present disclosure is shown. Control information is passed to and from the CMS block 520 through DMC interface 510. The control information is passed through Digital Item Declaration Language (DIDL)-lite interface 560 to DLNA interface 570. Content related information from content source 1, content source 2, and content source 3 is passed into DMS 520 through plug-in 530, plug-in 532, and plug-in 534 respectively. Each of plug-in 530, plug-in 532, and plug-in 534 interface to Content Plug-in interface 540 and further to CMS aggregator 550. CMS aggregator 550 interfaces to DLNA interface 570. DLNA interface 570 provides an output to other portions of the operating code, such as the content playback or the content storage portion of the operating code.

DMC interface 510 receives instructions as part of a command set delivered from other portions of the operating code, or from a component external to the device. The command set includes instructions for processing of the media content and associated information as part of CMS 520. The command set may include search requests, update requests, content management or status changes, and content access requests. DMC interface 510 may also direct the results from processing these requests in CMS 520 to other portions of the operating code. DMC interface 510 may also provide results to an external interface or visual display for the device as part of a user interface.

CMS 520 receives the instructions from DMC interface 510 and processes the instructions to direct the functions residing within CMS 520 to generate results and produce results or values. The results or values may either be provided through DMC interface 510 or directly to other portions operating code. CMS 520 includes instructions for scanning in, or ingesting, content from different sources through plug-in 530, plug-in 532, and plug-in 534. The content may be identified and provided from a plurality of different sources including, but not limited to live TV, recorded content, video on demand, or media from a USB or other storage device. It is important to note that although three plug-ins are shown in FIG. 5, more or fewer plug-ins may be present in other embodiments. CMS 520 uses DMC interface 510 for providing information about all available content after scanning. CMS 520 may further interface to other modules or services within the operating code, including, but not limited to, a separate DLNA service, a user interface for a local display device, and a remote client service capable of running on a remote device. CMS 520 may also operate as a DLNA compliant content manager to publish and/or stream out the content to other portions of the operating code and ultimately to other devices.

Within CMS 520, DIDL-lite interface 560 provides a command translation and conversion interface for both commands received through DMC interface 510 as well as results provided to DMC interface 510. In some cases, such as when DMC interface 510 receives DLNA compliant commands, DIDL-lite interface 560 may not perform any translations or conversions. Instead, DIDL-lite interface 560 may pass the DLNA compliant commands through for processing in DLNA interface 570. In other cases, such as when results of a query are provided to another portion of the operating code, the DIDL-lite interface 560 converts the information to a DIDL script document containing the search results in order to provide the information.

One or more source plug-ins 530, 532, and 534 may be configured as a Digital Video Broadcasting (DVB) content source plug-in. A DVB event source plug-in provides specific interfacing to the program guide data and DVB format content that is carried within a broadcast signal stream adhering to one of the DVB standards.

One or more source plug-ins 530, 532, and 534 may also be configured as a broadband content source plug-in. A broadband event source plug-in provides specific interfacing to one or more web or Internet based content delivery services containing content that is provided in IP format.

One or more source plug-ins 530, 532, and 534 may further be configured as a filesystem plug-in. A filesystem plug-in scans an external device or file path present on the network and/or connected to the device. The filesystem plug-in may recursively or periodically scan for media files and pull metadata out of each media file and cache it in a temporary database. The filesystem plug-in may be configured to scan and read content in several computer based storage and playback formats including, but not limited to, the Motion Picture Entertainment Group Standard MPEG-2 and MP-3 formats and the Joint Photographic Experts Group JPEG format.

The content plug-in interface 540 allows event sources (e.g., content source 1, content source 2, and content source 3) to register with CMS 520 in order to provide content and allow scanning of content information and metadata associated with the content. Registration and configuration for each content source may further be performed as part of a specific plug-in (e.g., plug-in 530, plug-in 532, or plug-in 534). Content plug-in interface 540 may also provide conversion and/or translation of commands and data structures for use in CMS aggregator 550. By using a plug-in model customizations may be made for a particular service or content provider in the plug-in without affecting the rest of CMS 520. The content plug-in interface 540 also includes interfaces for other source plug-ins (not shown) to further permit CMS 520 to accommodate event or entry data from additional multiple sources.

CMS aggregator 550 gathers and further identifies, catalogs, and categorizes content that either exists, or is available, from the multiple content sources interfaced or connected to the device (e.g., client device 108A-N in FIG. 1, DMS 230 in FIG. 2 and network device 300 in FIG. 3). These sources may include sources interfaced through source plug-ins 530, 532, and 534 as well as previously recorded or downloaded content residing on the device. CMS aggregator 550 uses the content plug-ins to publish the available metadata when search/browse requests are made as a result of commands from DMC interface 510 and based on the CDS tree.

DLNA interface 570 provides an application programming interface (API) to digest the content and help provide information to build the content limitation identifier, or <res> tag. DLNA interface 570 uses configuration information in conjunction with the content and metadata from CMS aggregator 550 to determine how the content limitation identifier or <res> tag should be constructed. DLNA interface 570 also processes DLNA compliant commands from DMC interface 510 and additional manages DLNA compliant responses to other portions of the operating code or to components external to the device.

CMS 520 further provides view definitions that organize the scanned in or ingested content into content trees, or containers, for content, items, or metadata that is stored internally. An API provides the ability to create, modify and remove items and/or containers as necessary, allowing content to be updated dynamically. Using a unique identifier for item or content element, metadata for that item or content element can be accessed regardless of the content or directory views that requested and/or applied.

As mentioned above, CMS 520 may provide content scanning, identification, and presentation functions. CMS 520 may also manage content streaming capability. CMS aggregator 550 may maintain a configuration profile containing the supported media type, bitrates, resolution and protocol supported by the device. This information may be provided from another portion of the operating code through DMC interface 510. Using this configuration profile, CMS aggregator 550 may then provide the combination of content limitation identifiers or <res> tags required to represent the content queried by a search or browse request. The <res> tags may be configured as part of DLNA compliant commands and passed through DLNA interface 570 to other portions of the operating code or external to the device. The configuration profile may also contain permission control on available content that may not be allowed streamed even though it can be queried, for example for digital transmission content protection-internet protocol (DTCP-IP) support.

As an example, when a DIDL-lite document is created for the result set from a query in CMS 520, CMS aggregator 550 may build up <res> tags from each item satisfying the query. One item can have multiple <res> tags created depending on the capability of the device to stream that content. The capabilities are identified as part of the CMS configuration file and determine, for instance, the supported containers, encoders, decoders, transcoders, and segment/duration sizes for each item, as well as link protection, if any.

The content limitation identifiers or <res> tags may be constructed based on the configuration profile and adapted to the content scanned through the source plug-ins 530, 532, and 534. For content provided by a source plug-in configured as a filesystem plug-in, DLNA interface libraries may be used to determine multipurpose internet mail extension (MIME) type and DLNA compliant command information. An exemplary structure for a <res> tag is shown below:

<res protocolInfo="protocol:*:MIMEtype: DLNA.ORG_PN=mediaformat; DLNA.ORG_PO=seekinfo; DLNA.ORG_CI=transcoding; DLNA.ORG_FLAGS=flags">URl</res> where

Protocol is:

internal—means the content will be played internally on the STB by the local DMR. That means the original source URI should be populated into the uniform resource identifier (URI) field (eg., file:///mnt/hdd0/movie.mpeg)

http-get—means the content will be streamed out of the STB as hypertext transfer protocol (HTTP) out.

rtsp-rtp-udp—means the content will be streamed out of the STB using realtime transport protocol (RTP) or user datagram protocol (UDP) protocol.

MIME type—describes the MIME type, such as may be defined for media content as part of the DLNA Media Format (e.g., video/mpeg, audio/mp3, or image/jpeg).

Media Format—This should be the DLNA Media Format guideline for the container, audio and video codecs used. This is part of the DLNA standard and must properly map to a supported literal define.

Seek Info—a two bit value that represents supported seek functionality. 01=byte seek, 10=time based seek, 11=both, 00=none.

Transcoding—describes if the content is transcoded or not. 0=not transcoded, 1=transcoded.

Flags—support for DLNA flags.

Uniform Resource Identifier (URI)—The URI is created based on if the content is internal or streamed. If internal, the original source information should be used. That would mean for Live TV (dvb://x.x.x), recordings (rec://x), or hard disk drive (HDD)/USB content (file:///xxxx). For streaming, an http://xxxxURl will be created based on the following format:

STB_IP—this should be the internet protocol (IP) of the STB.

URI—The original source URI of the content so that route can attach to it.

Sink Type—Currently http, udp, rtp/rtsp and httplive are supported.

Transcode—literal string matching the transcode options available in route

Title—string title (might need to be in quotes),

Segment-duration—length of segment in seconds.

Playlist-duration—the length in seconds for the playlist chunks

In conjunction with one or more view specifications created in CMS 520, content such as Live TV, video on demand (VOD) or recorded content stored can be enabled or disabled for sharing using <res>tags. The <res> tags also provide the ability to support link protection of premium content, including content provided over a secure network. As a result, CMS 520 will not expose the premium content by creating <res> tags that allow streaming of the content over an unauthorized network.

Figure 6:
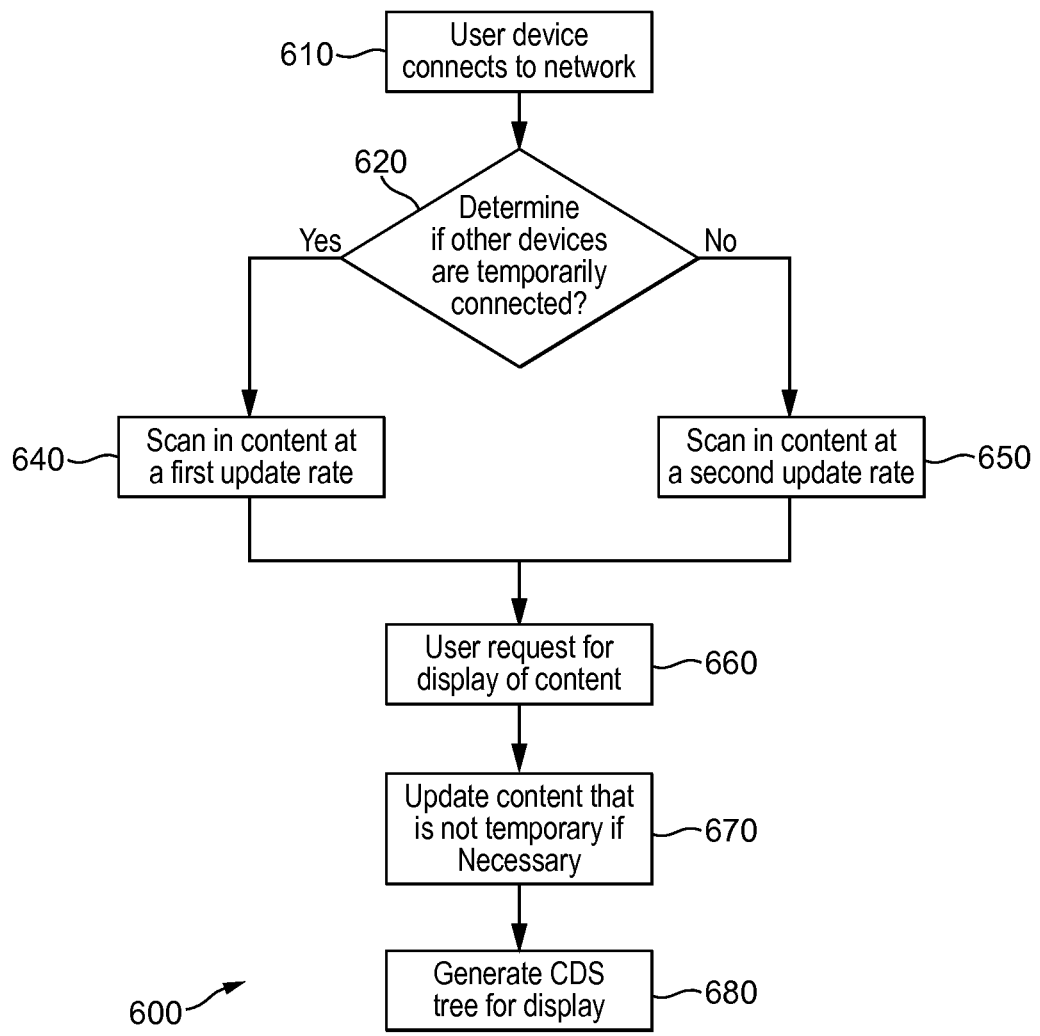
FIG. 6 is a flowchart of an exemplary process for managing the updates and presentation of media content as part of a directory in accordance with the present disclosure.

Turning now to FIG. 6 a process 600 for managing the updates and presentation of media content as part of a directory in a device according to aspects of the present disclosure are shown. Process 600 described below may be used to improve the scanning, updating, and management performance for content that is part of a directory system, or CDS, in a device. Process 600 will primarily be described with respect to the network device 300 described in FIG. 3. However, one or more of the steps in process 600 may be equally applicable to one or more of the elements described in FIG. 2 or to client devices 108A-N described in FIG. 1. Additionally, one or more of the steps in process 600 may be incorporated as part of the architecture 500 described in FIG. 5. Further, it is important to note that some of the steps described in process 600 may be implemented more than once, or may be implemented recursively. Such modifications may be made without any effect to the overall aspects of either process 600.

At step 610, a user device (e.g., network device 300) is connected to a home network. The connection may be made through a home network interface, such as network interface 324. In a preferred embodiment, the user device is a DLNA compliant device, such as a DMS, and the network operates using the DLNA protocol to interface with other DLNA compliant components. The user device also includes the capability to identify and scan in, or ingest, content and information from the other devices on the home network. Additionally, the user device includes the capability to directly connect to, or mount, certain storage elements including, but not limited to hard drives, optical drives, and USB memory devices. It is important to note that other devices in the home network may also include the capability to interface to storage elements.

At step 620, the user device (e.g., network device 300) determines if one or more of the other devices or storage elements connected through the home network or connected directly to the device is/are temporarily connected. These temporary or transient devices or storage elements may include content and information that is only available as long as the device or storage element is connected. A temporary or transient status indication may be advantageous to the generation and maintenance of a content directory structure. For example, any content playlists or information for content may be stored or cached in a memory in the user device and updated periodically, as will be described below. In addition, a scan operation on a network device or storage element may take significant time to parse every file on the device. By periodically scanning the content and information, the scanning may be done at a time when the user may be unaware that the scanning is being performed. As a result, content search speed for any available content on the home network using the user device may be improved.

The temporary or transient status for a network device or storage element may be determined or identified through a control setting in conjunction with display interface 318 and controller 314. For example, when the network device or connected storage element is identified by the user device, at step 620, a menu entry may be provided for display to prompt the user to also identify the device or element status in the home network as temporary or not temporary. Further, certain connections may be automatically identified as temporary. For example, a storage element connected through a USB connection on the device, or on any other device connected through the network, may be identified as temporary. Finally, the user device may use a transaction history with the network connected device or connected storage element to identify whether the network device or storage element is temporary. The transaction history may be monitored by controller 314 through network interface 324. As a result, any identification and management of this content for use by the device may be treated differently from devices or storage elements that may be identified as more permanently connected.

If, at step 620, a connected device or storage element is determined to be temporarily connected, then at step 640, a first update mechanism is initiated to check for, and scan in, content using a time interval that is at a first periodic update rate. The temporary or transient status of a network connected device or storage element typically requires a higher update rate or shorter time interval for monitoring the availability of content. The more frequent scanning for content due to the higher update rate results in improved maintenance of the directory of available content and an improved response time to user requests. Additionally, at step 640, any content and information that is scanned in may be stored in a memory structure in the user device.

If, at step 620, a connected device or storage element is determined to not be temporarily connected, then at step 650, a second update mechanism is initiated to check for, and scan in, content and information using a time interval that is at a second periodic update rate. Because the connected device or storage element is not temporary, a lower monitoring rate for the availability of content may be used. In some embodiments, the second periodic update rate may be ten times lower than the first update rate used for temporary or transient network devices or storage elements. Further, in other embodiments, no periodic monitoring for network devices or storage elements that are not identified as temporary may be necessary. In this case, content updates or scans may occur only when user requests are initiated. Additionally, at step 650, any content and information that is scanned in may be stored in a memory structure (e.g., control memory 320 or storage device 312) in the user device.

Following the establishment of either a first update rate at step 640 or a second update rate at step 650, at step 660, a request from the user is received for the display of content or information related to the content. The user request may be part of a content search or a content browse request received through user interface 316 or handheld interface 322. The user request may also be part of a content playback request. Additionally, at step 670, a further update may be performed for connected devices or storage elements that are not temporary. The further update, at step 670, may be necessary if no periodic monitoring or updating is performed at step 650.

Last, at step 680, a directory or CDS tree of available content is generated for display. The directory or CDS tree is generated using the latest available content from a connected device or storage element identified as temporary using the update rate established at step 640. The directory or CDS tree may be generated using video processor 310 in conjunction with information from controller 314. The available content may be retrieved from a local memory (e.g., control memory 320 or storage device 312) in the user device. The directory or CDS tree also includes the latest available content from the connected devices or storage elements that are not temporary using either the update rate established at step 650 or the further update at step 670. Further, at step 680, the generated directory or CDS tree may be provided from the user device through display interface 318 to a display device (e.g., DMR 240 described in FIG. 2).

It is important to note that in addition to generation of a directory or CDS tree at step 680, the user request may include a direct request for access for playback of content. Based on the updated list of content, the content may be accessed and provided for playback by the user device and a display device. In addition, a restriction on playback may be identified as part of the directory or CDS tree based on an identifier or <res> tag generated as part of the information for the media content.

Figure 7:
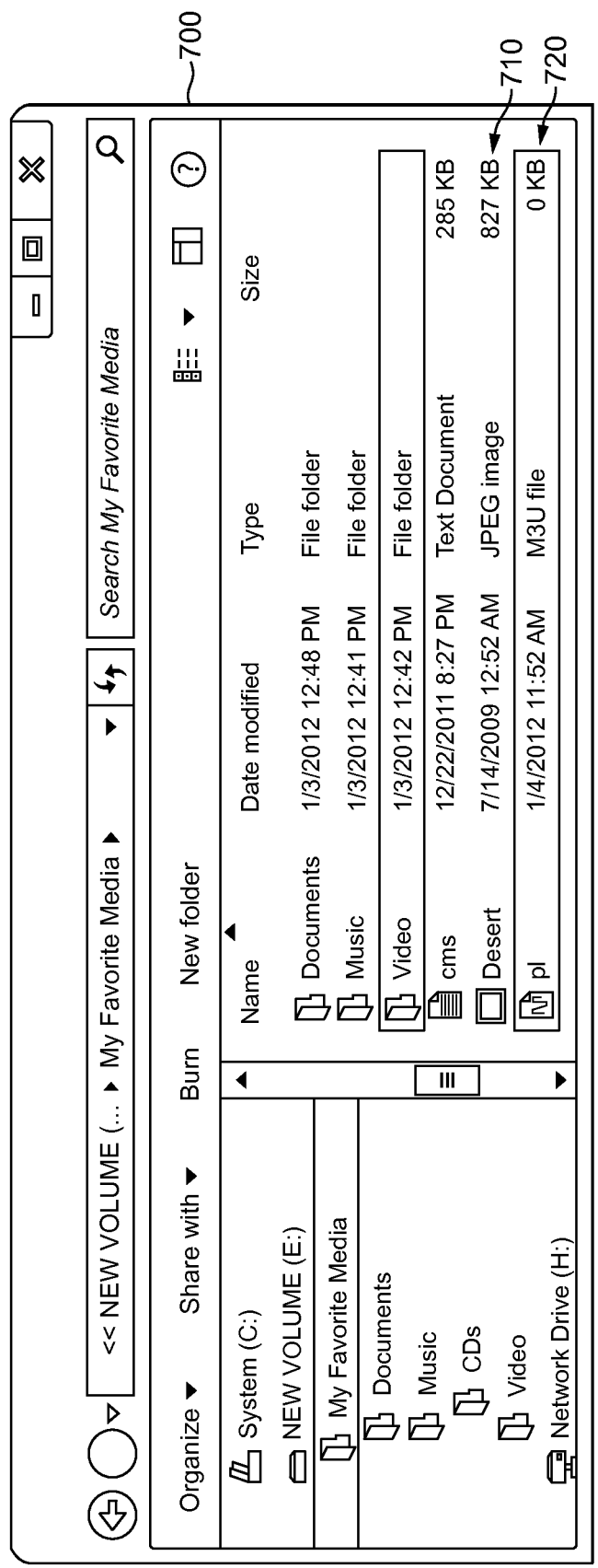
FIG. 7 is a diagram illustrating an exemplary filesystem configuration in accordance with the present disclosure.

Turning now to FIG. 7, an illustration of a view for a file system configuration 700 according to aspects of the present disclosure is shown. The filesystem configuration 700 shows the scanned and identified content from a filesystem plug-in (e.g., source plug-in 530, 532, 534 as part of the code in DMS 520 in FIG. 5) similar to scanning in or ingesting content at step 640 and step 650 in FIG. 6. The content source for filesystem configuration 700 may be an external USB memory device attached to the device or may be a networked memory source connected to the device through a home network. Filesystem configuration 700 includes an entry 710 identified as "Desert". Entry 710 is a content file in a JPEG format. Filesystem configuration 700 also shows an entry 720 identified as "pl". Entry 720 is an M3U filetype which represents a content playlist. Both entry 710 and entry 720 are included as part of a volume label "NEW VOLUME (E:)" and under a folder labeled "My Favorite Media/Videos". It is important to note that other folders and content may exist under the volume label "NEW VOLUME (E:)" and may also be scanned in.

Additionally, filesystem configuration 700 may represent a snapshot of the content to be scanned in or ingested at a given time. If the content source is identified as a temporary or transient source, as described earlier in FIG. 6, then at a different time, the content source may no longer be available or the content on the source may have changed. As a result, periodic scanning of the content source by the filesystem plug-in may be initiated in order to update the available content in the DMS (e.g., DMS 230 in FIG. 2).

Figure 8:
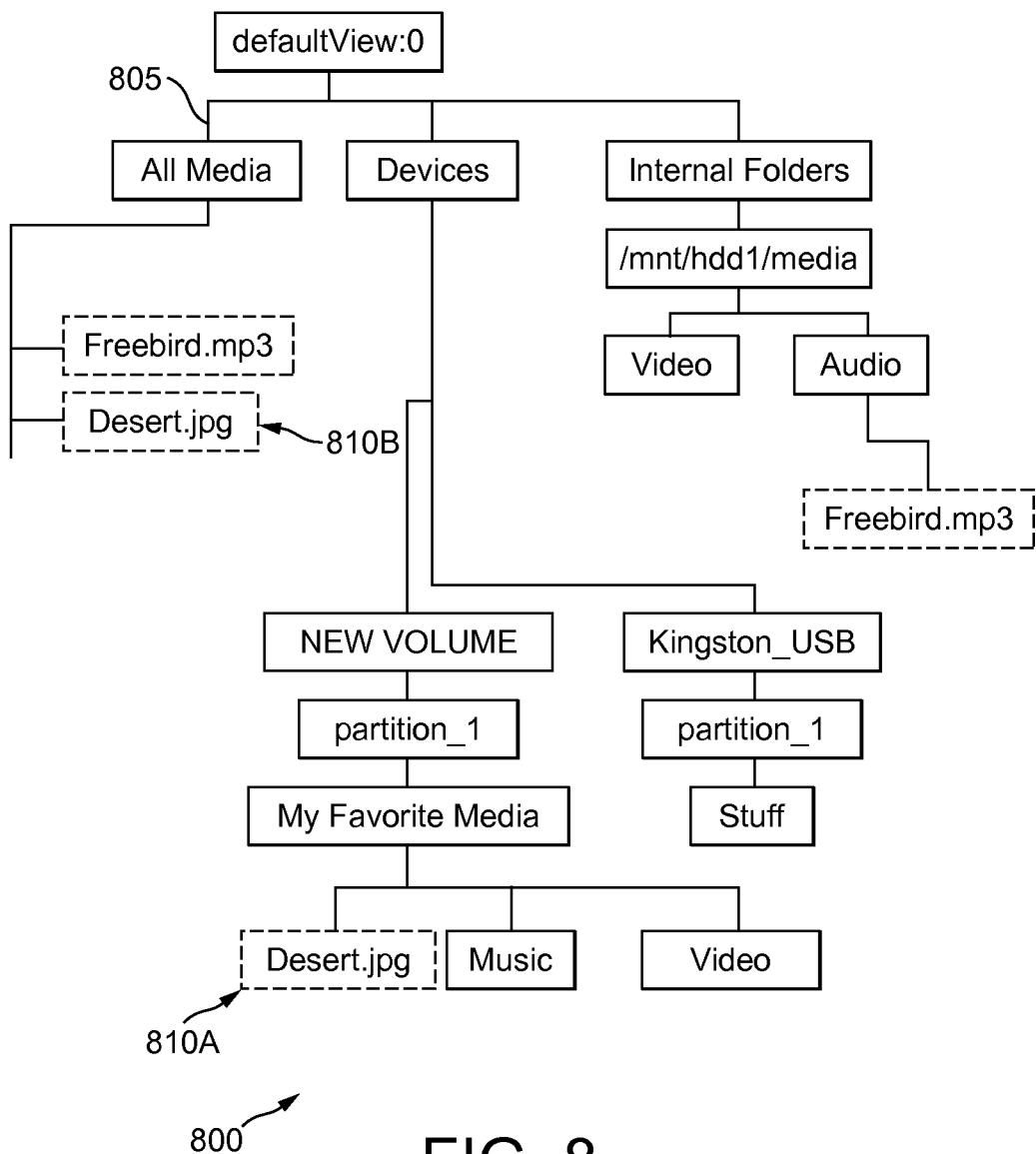
FIG. 8 is a diagram illustrating an exemplary view of available content as part of a directory system in accordance with the present disclosure.

Turning now to FIG. 8, a diagram illustrating an exemplary content directory 800 according to aspects of the present disclosure is shown. Content directory 800 represents a content directory including the content scanned in from the filesystem plug-in described in FIG. 7. As described earlier, the content available as part of a DMS may be organized into one or more CDS trees or views. Note that content directory 800 is identified as defaultView, the view used for the CDS tree that is exposed to DLNA clients. A user may configure one or more CDS trees for a different view. In the view shown, labeled defaultView, a subtree with an "All Media" container shows all items found from instances of all of the plug-ins. Additionally, there is a subtree with a Folders container that shows further subfolder trees for all internal folders. There is also a subtree with a "Devices" container that shows the folder trees for all external devices that are connected to the device. Within the "Devices" container, a path is shown identifying the location for the content entry 810A labeled "Desert.jpg", which is equivalent to entry 710 in FIG. 7. Further, a second entry 810B also labeled "Desert.jpg" is shown under "All Media". In this manner, the content "Desert.jpg" may be found using more than one search tree or through more than one search request. Also note that an additional content entry, "Freebird.mp3", has been scanned in to the DMS and included in content directory 800, along with content already located in the DMS.

It is important to note that the view shown in FIG. 8 and the cataloging system for the directory or CDS tree represents one cataloging system using only the source identification for the content or information. Other cataloging systems may be possible using additional information or metadata that is scanned in or ingested for the content. For example, the cataloging system may include subtrees with containers identified as, but not limited to, artist, actor, genre, and year.

Figure 9:
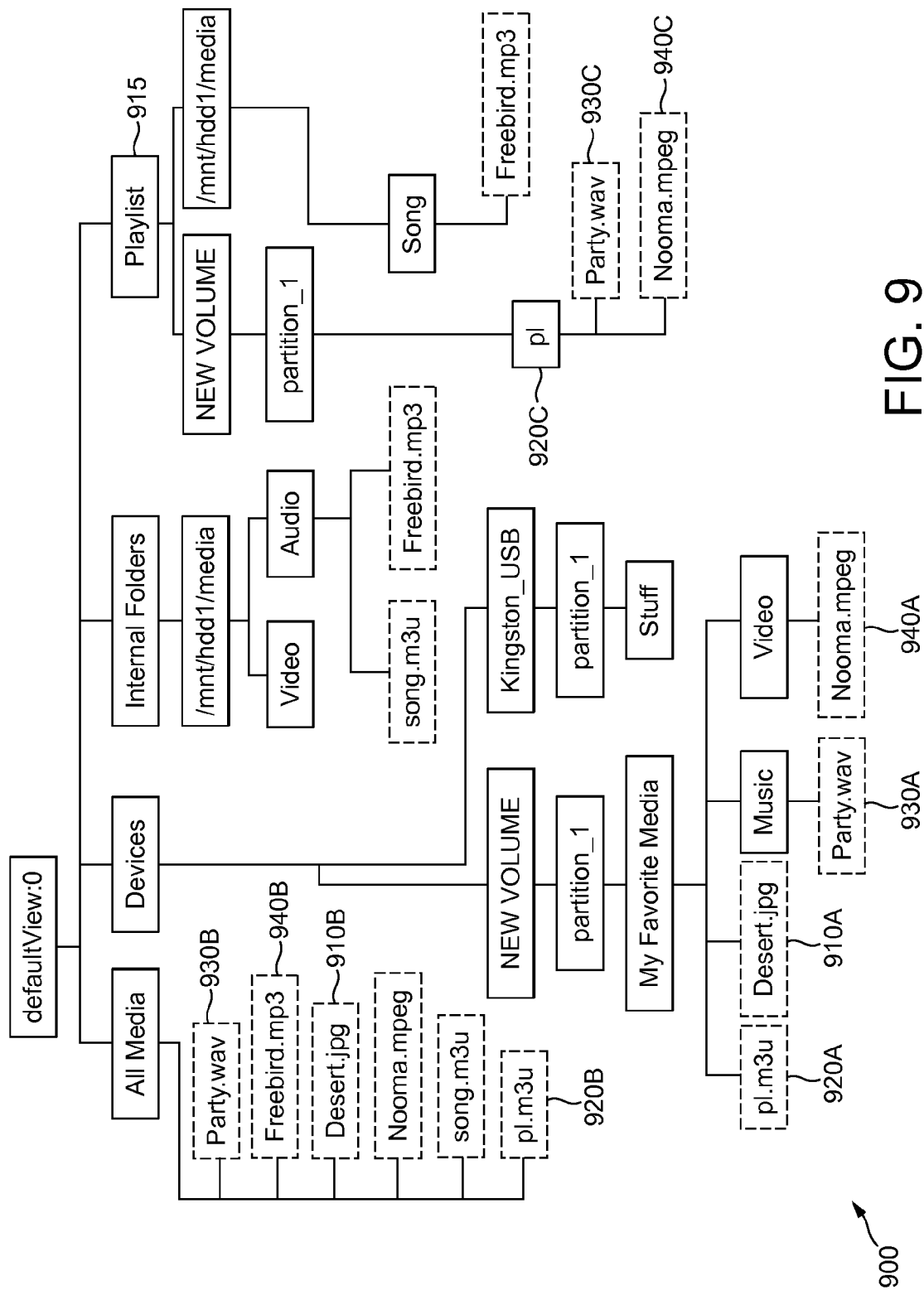
FIG. 9 is a diagram illustrating another exemplary view of available content as part of a directory system in accordance with the present disclosure.

Turning now to FIG. 9, a diagram illustrating an exemplary content directory 900 according to aspects of the present disclosure is shown. Content directory 900 includes the functionality to show playlists as a part of a CDS parsed playlist tree. A parsed playlist tree allows playlist files (e.g., M3U files) found during a file system scan to be parsed and automatically added to the CDS tree (e.g., defaultView or other views). When a playlist file is detected, the file is parsed and each item in the playlist is checked to see if the file is a media file and exists in the folder tree that is being scanned. A playlist container is created under a specified container in content directory 900 and the items that match files in the folder tree are added as items to the playlist container. In content directory 900, an entry 920A, identified as pl.m3u, and which is equivalent to entry 720 in FIG. 7, is shown under the "Devices" subtree. Similarly, an entry 920B is included under the "All Media" subtree and an entry 920C is included under the "Playlist" subtree. Further, the content for pl.m3u is shown under entry 920C. The content is further shown under the All Media subtree but shown as separate from entry 920B. Finally, the content is shown as part of the subtree structure under the "devices" subtree and also separate from the entry 920A. Similar to FIG. 8, the content from the playlist "pl.m3u" as well as the playlist itself, may be found using more than one search tree or through more than one search request.

The playlist identified as entry 920c in content directory 900 may be parsed using a software architecture that includes playlist content parser software. In one embodiment a universal plug and play (UPnP) CDS playlist parser may be included as part of the CMS architecture 500 described in FIG. 5. The UPnP CDS playlist parser parses playlist files (e.g., .m3u, .pls, .asx, .wsx file extensions) and creates CDS equivalent playlist containers with playlist items that match the files specified in the playlist file. Parsing may occur when the CMS software is scanning a mounted file system device for media files. Since the CMS software may cache the media files and metadata as CDS items, the software may look for each file listed in the playlist file and insert the CDS item into the playlist container if it exists. Further, since the playlist containers are configurable, a user may choose the parent location of the playlist containers in the directory or CDS view specification. The user may also specify whether to include playlists from internal folders, external folders, or both. As with any CDS container or item, a user may browse and search the metadata in the playlist containers.

Additionally, the content directory 900 represents a content directory including the content scanned in from the filesystem plug-in described in FIG. 7 following a subsequent scan or update based on a periodic update rate for temporary or transient devices, as described at step 640 in FIG. 6. The latest scan included two additional entries, a file 930a identified as "party.wav" and a file 940a identified as "nooma.mpeg" The entries are also shown included as entries 930b and 940b under the All Media subtree folder and entries 930c and 940b under the pl subtree folder 920c.

The file system content from the external device or file path that is scanned in through a plug-in (e.g., plug-in 530, plug-in 532, or plug-in 534 described in FIG. 5) may appear in several possible view configurations as part of a CDS tree. For example, the file system content may appear in a dynamic rule based container just like other content provider plug-in, as a CDS subtree that matches the folder tree/file structure of the device, and/or as a parsed playlist tree. Since the tree containers are configurable, a user may choose the parent location for the folder trees or playlist trees in the view, and also specify whether to include trees from internal storage, external devices, or both. An embodiment of the software code to implement CDS tree, such as those illustrated in FIG. 8 and FIG. 9 is shown below:

```
<?xml version="1.0" encoding="UTF-8" ?>
<group viewname="defaultView">
<group name="All Media">
<match property="upnp:class">
<value compare="like">object.item </value>
</match>
<content>
<datasource>
<item type="FSY" name="Folders" />
</datasource>
</content>
</group>
<group name="Devices">
<fsyXmlTree treeType="FOLDER" contentType="EXTERNAL"/>
</group>
<group name="Internal Folders">
<fsyXmlTree treeType="FOLDER" contentType="INTERNAL"/>
</group>
<group name="Internal Folders">
<fsyXmlTree treeType="PLAYLIST" contentType="BOTH"/>
</group>
</group>
```

Several exemplary uses for the embodiments of the present disclosure are possible. In a first exemplary use, a user has plugged a USB storage device to a STB that is connected to a home network. The user has also added a directory on the local hard drive of the STB as part of the content scan. The user has setup a view for the directory or CDS tree as shown in FIGS. 8 and 9. Further, the user has a mobile DMP phone that can connect to the network wirelessly. The user requests a content search using the mobile DMP phone and browses down the CDS tree to the "pl" container and selects all the items to play. The mobile DMP phone immediately plays the two songs in the playlist shown in FIG. 9.

In a second exemplary use, the user has the same setup as described above. Using the mobile DMP phone, the user requests a search on the top level container of the CDS tree for all audio items that have the artist of "Michael Jackson". This will search all cached metadata of all devices connected to the STB and return all the matching songs from all network devices and connected storage devices as well as the local hard drive. The scanned content includes any updates that have occurred for network devices and connected storage devices that are identified as transient or temporary. A directory or CDS tree structure may be created that includes a subtree folder identified as "artist" and an additional subtree folder identified as "Michael Jackson". The user may then select and play all those songs under the folder "Michael Jackson" on the mobile DMP phone.

In a third exemplary user, the user is operating a computer that is connected to the home network. The computer includes a program that includes a CMS software architecture that can browse the STB and the locally connected USB device and display content in a directory or CDS tree. The user wants to takes a break from work to watch a comedy movie and knows that there are many new movies on a connected USB device but doesn't remember which device on the network includes the USB device. The user does a search on the "Devices" container for genre of "comedy". The scanned content includes any updates that have occurred for network devices and connected storage devices that are identified as transient or temporary. A directory or CDS tree structure may be created that includes a subtree folder identified as "genre" and an additional subtree folder identified as "comedy". The user may then select a movie that is identified under the folder "comedy" and that is available for streaming the computer based on the permissions in the identification tags for the content.

The present embodiments describe a content management structure that supports home network components, including components with temporary access as well as differing content file structures. The embodiments allow a user to browse/search rich metadata (e.g., title, actor, genre, artist, etc. . . . ) related to the content on any external device connected through a network or an internally mounted device with a file system (USB, Bluetooth, Hard Drives) through device using a CMS interface including, but not limited to gateways, DLNA compliant devices, and computing devices. Once content and information is scanned in, the user may customize where the content should appear in the CDS tree or view. Since a CMS may cache the metadata and file system tree in a CDS structure, any DLNA device on the network can quickly search the rich metadata of all mounted devices simultaneously and stream any of the content on that DLNA device. In addition, the view configuration allows the user to search and/or display just all local content, or search and/or display just the removable device content. This configuration control may speed up a search if a user knew the content that he/she was interested in resided locally or remotely. Further, the caching and immediate viewing of content and the additional periodic updating mechanisms for content sources identified as transient sources or devices offer distinct improvement to the user interface and content management experience of the user. The user may also stream the content from the networked or mount device on another DLNA device.

Additionally, one or more embodiments described above allows a user to stream content referenced inside a playlist file on a device, such as a DLNA device, without the need to parse the playlist file type. A user may connect to any networked or mounted device and, if the device contains any playlist files, a CDS playlist container is created with playlist items in the CDS view for each playlist that is found. The playlist items may contain rich metadata (e.g., title, actor, genre, artist, etc. . . . ) so that a user can browse or search the metadata in the playlist containers. A user may browse the playlist container that is created so that one or more of the items in the playlist can be played using the URIs included in the metadata of the items. The device may be mounted or networked to a device that runs a CMS software package. Since CMS creates the playlist container and caches the metadata for the playlist items in the CDS tree, any DLNA compliant device on the network may quickly stream a list of items in a playlist file. Further since all playlists may be placed in a specified part of the view, a user can easily search the rich metadata of all playlists on all mounted devices simultaneously and stream any of the playlists or individual playlist items on that DLNA device. Also the view configuration allows the user to search just local playlists, or search just the removable device playlists, updated recursively or periodically using the embodiments described above. This playlist control, along with the updating mechanisms may speed up a search if a user knew the playlist that he/she was interested in resided locally or remotely.

Although embodiments which incorporate the teachings of the present disclosure have been shown and described in detail herein, those skilled in the art can readily devise many other varied embodiments that still incorporate these teachings. Having described preferred embodiments of a method and apparatus for managing a media content database on a device (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

What is claimed is:

1. A method comprising:
   connecting a media device to a home network, the home network containing a plurality of media content sources that store content available to the media device;
   identifying at least one media content source from the plurality of media content sources as a temporary content source, the temporary content source not permanently connected to the home network;
   identifying at least one second media content source from the plurality of media content sources as not being a temporary content source;
   recursively scanning, at a first frequency rate, the at least one first temporary media content source to identify all available media content on the at least one first temporary media content source;
   recursively scanning, at a second frequency rate, the at least one second media content source to identify all available media content on the at least one second media content source, the first frequency rate being higher than the second frequency rate, wherein the first frequency rate and the second frequency rate are non-zero rates; and
   updating a catalog of media content available to the media device based on scanning the at least one first temporary media content source and the at least one second media content source.

2. The method of claim 1, further comprising:
   retrieving information associated with the media content on the at least one first temporary media content source; and
   generating a displayable directory structure that provides the information about the media content in separate lists based on at least two cataloging criteria.

3. The method of claim 2, further comprising providing the directory structure from the media device for display on a display device.

4. The method of claim 2, wherein the display directory structure is organized as a tree structure organized in separate lists identified by at least one of All Media, Devices, Internal Folders, Playlist, Actor, Artist, Genre, and Year.

5. The method of claim 4, wherein the same media content appears in at least two of the separate lists.

6. The method of claim 2, wherein the media content includes content recorded on the at least one first temporary media content source, and wherein the information about the media content includes an identifier regarding the playback of the media content.

7. The method of claim 1, wherein the media content includes content recorded on the at least one first temporary media content source.

8. The method of claim 1, wherein the media content includes a playlist, the method further comprising parsing the playlist to retrieve the content available from the playlist.

9. The method of claim 1 wherein the home network communicates using the digital living network alliance protocol.

10. The method of claim 1, wherein the first frequency rate is at least 10 times greater than the second periodic rate.

11. The method of claim 1, wherein the at least one first temporary media content source is a connectable storage element.

12. The method of claim 1, wherein the media device is further connected to at least one of a broadcast signal network and the Internet.

13. An apparatus comprising:
  means for connecting to a home network, the home network containing a plurality of media content sources that store media content available to the media device;
  means for identifying at least one first media content source from the plurality of media content sources as a temporary content source, the temporary content source not permanently connected to the home network;
  means for identifying at least one second media content source from the plurality of media content sources as not being a temporary content source;
  means for recursively scanning, at a first frequency rate, the at least one first temporary media content source to identify all available media content on the at least one first temporary media content source;
  means for recursively scanning, at a second frequency rate, the at least one second media content source to identify all available media content on the at least one second media content source, the first frequency rate being higher than the second frequency rate, wherein the first frequency rate and the second frequency rate are non-zero rates; and
  means for updating a catalog of media content available to the media device based on scanning the at least one first temporary media content source and the at least one second media content source.

14. The apparatus of claim 13, further comprising:
  means for retrieving information associated with the media content on at the least one first temporary media content source; and
  means for generating a displayable directory structure, the displayable directory structure including the information about the media content in separate lists based on at least two cataloging criteria.

15. The apparatus of claim 14, wherein the display directory structure is organized as a tree structure organized in separate lists identified by at least one of All Media, Devices, Internal Folders, Playlist, Actor, Artist, Genre, and Year.

16. The apparatus of claim 15, wherein the same media content appears in at least two of the separate lists.

17. The apparatus of claim 14, wherein the media content includes content recorded on the at least one media content source, and wherein the information about the media content includes an identifier regarding the playback of the media content.

18. The apparatus of claim 13, wherein the media content includes content recorded on the at least one first temporary media content source.

19. The apparatus of claim 13, wherein the media content includes a playlist, the apparatus further comprising a means for parsing the playlist to retrieve the content available from the playlist.

20. The apparatus of claim 13 wherein the home network communicates using the digital living network alliance protocol.

21. The apparatus of claim 14, wherein the first frequency rate is at least 10 times greater than the second periodic rate.

22. A media content apparatus connected to a plurality of media content sources, the apparatus comprising:
  a receiver coupled to the home network, the receiver scanning the plurality of media content sources to identify available media content, the media content sources storing media content available to the media content apparatus; and
  a controller coupled to the receiver, the controller determining if at least one first media content source from the plurality of media content sources is not permanently connected to the home network, determining if at least one second media content source from the plurality of media content sources is permanently connected to the home network, recursively scanning the at least first media content source to identify all available media content on the at least one first media content source at a first frequency rate, and recursively scanning the at least one second media content source to identify all available media content on the at least one second media content source at a second frequency rate, the first frequency rate being higher than the second frequency rate, wherein the first frequency rate and the second frequency rate are non-zero rates.

23. The apparatus of claim 14, further comprising means for providing the directory structure from the media device for display on a display device.

24. The apparatus of claim 13, wherein the at least one first temporary media content source is a connectable storage element.

25. The apparatus of claim 13, wherein the media device is further connected to at least one of a broadcast signal network and the Internet.

26. The media content apparatus of claim 22, wherein the receiver retrieves information associated with the media content on the at least one first media content source; and the controller generates a displayable directory structure that provides the information about the media content in separate lists based on at least two cataloging criteria.

27. The media content apparatus of claim 26, wherein the controller provides the directory structure from the media device for display on a display device.

28. The media content apparatus of claim 26, wherein display directory structure is organized as a tree structure organized in separate lists identified by at least one of All Media, Devices, Internal Folders, Playlist, Actor, Artist, Genre, and Year.

29. The media content apparatus of claim 28, wherein the same media content appears in at least two of the separate lists.

30. The media content apparatus of claim 26, wherein the media content includes content recorded on the at least one first media content source, and wherein the information about them media content includes an identifier regarding the playback of the media content.

31. The media content apparatus of claim 22, wherein the media content includes content recorded on the at least one first media content source.

32. The media content apparatus of claim 22, wherein the media content includes a playlist, the controller parses the playlist to retrieve the content available from the playlist.

33. The media content apparatus of claim 22, wherein the home network communicates using the digital living network alliance protocol.

34. The media content apparatus of claim 22, wherein the first frequency rate is at least 10 times greater than the second frequency rate.

35. The media content apparatus of claim 22, wherein the at least one first media content source is a connectable storage element.

36. The media content apparatus of claim 22, wherein the media device is further connected to at least one of a broadcast signal network and the Internet.

* * * * *